US009188456B2

(12) United States Patent
Vaghefinazari et al.

(10) Patent No.: US 9,188,456 B2
(45) Date of Patent: Nov. 17, 2015

(54) SYSTEM AND METHOD OF FIXING MISTAKES BY GOING BACK IN AN ELECTRONIC DEVICE

(75) Inventors: Pedram Vaghefinazari, Los Angeles, CA (US); Ritchie Huang, Torrance, CA (US); Stuart Masakazu Yamamoto, Hacienda Heights, CA (US)

(73) Assignee: Honda Motor Co., LTD., Tokyo (JP)

( * ) Notice: Subject to any disclaimer, the term of this patent is extended or adjusted under 35 U.S.C. 154(b) by 0 days.

(21) Appl. No.: 13/093,797

(22) Filed: Apr. 25, 2011

(65) Prior Publication Data

US 2012/0272177 A1 Oct. 25, 2012

(51) Int. Cl.
G06F 3/048 (2013.01)
G01C 21/36 (2006.01)
G06F 3/0488 (2013.01)
G06F 3/0489 (2013.01)

(52) U.S. Cl.
CPC .......... *G01C 21/3611* (2013.01); *G01C 21/362* (2013.01); *G01C 21/3608* (2013.01); *G06F 3/0488* (2013.01); *G06F 3/0489* (2013.01)

(58) Field of Classification Search
CPC ................................. G01C 21/3605
USPC ......... 715/780, 221, 223, 255–257, 705, 710, 715/714, 727, 728, 809, 816; 701/26, 400, 701/410, 411, 412, 416, 418, 420, 421, 425, 701/427, 443, 445, 4, 53, 473, 518, 533, 701/534, 538, 539
See application file for complete search history.

(56) References Cited

U.S. PATENT DOCUMENTS

| | | | |
|---|---|---|---|
| 6,064,959 A | 5/2000 | Young et al. | |
| 6,317,684 B1 * | 11/2001 | Roeseler et al. | 701/428 |
| 6,912,498 B2 | 6/2005 | Stevens et al. | |
| 7,107,147 B2 * | 9/2006 | Pascual et al. | 701/538 |
| 7,685,108 B2 * | 3/2010 | Miller et al. | 707/706 |
| 8,200,847 B2 * | 6/2012 | LeBeau et al. | 709/249 |
| 2002/0049528 A1 * | 4/2002 | Stangier et al. | 701/200 |

(Continued)

FOREIGN PATENT DOCUMENTS

EP 0 655 702 A2 5/1995
EP 1 050 872 A2 11/2000

(Continued)

OTHER PUBLICATIONS

Suhm, B. et al., "Interactive Recovery from Speech Recognition Errors in Speech User Interfaces," *Spoken Language, Proceedings of the Fourth International Conference on ICSLP*, 1996, pp. 865-868, vol. 2.

(Continued)

*Primary Examiner* — Dino Kujundzic
(74) *Attorney, Agent, or Firm* — Fenwick & West LLP

(57) ABSTRACT

A system, method, and computer program product for allowing a user to fix errors in a user input is described. An original user input providing a destination address or a point of interest is received by an in-vehicle computing system. Upon receiving a user input indicating an error in interpreting the original user input, the user is presented with a new query requesting the user to enter a portion of or a category associated with the original input. Once the updated user input providing a portion of the original input is received, the user input is identified and executed based on the original user input entry and the updated user input.

20 Claims, 6 Drawing Sheets

(56) References Cited

U.S. PATENT DOCUMENTS

| | | | |
|---|---|---|---|
| 2003/0023371 A1* | 1/2003 | Stephens | 701/209 |
| 2005/0015197 A1* | 1/2005 | Ohtsuji et al. | 701/202 |
| 2005/0159950 A1 | 7/2005 | Roth et al. | |
| 2005/0203751 A1 | 9/2005 | Stevens et al. | |
| 2006/0058943 A1* | 3/2006 | Pascual et al. | 701/200 |
| 2006/0190255 A1 | 8/2006 | Fukada | |
| 2006/0229802 A1* | 10/2006 | Vertelney et al. | 701/200 |
| 2006/0293889 A1 | 12/2006 | Kiss et al. | |
| 2007/0198171 A1* | 8/2007 | Steins et al. | 701/200 |
| 2008/0162137 A1 | 7/2008 | Saitoh et al. | |
| 2009/0171572 A1* | 7/2009 | Alteresco et al. | 701/209 |
| 2011/0179353 A1* | 7/2011 | Wood | 715/257 |
| 2011/0282574 A1* | 11/2011 | Alewine et al. | 701/201 |

FOREIGN PATENT DOCUMENTS

| | | |
|---|---|---|
| JP | 2004-240244 A | 8/2004 |
| JP | 3986015 | 8/2004 |
| WO | WO 2009/109169 A1 | 9/2009 |

OTHER PUBLICATIONS

Yu, G. T., "Efficient Error Correction for Speech Systems using Constrained Re-recognition," Submitted to the Department of Electrical Engineering and Computer Science, Massachusetts Institute of Technology, Jul. 17, 2008, seventy-five pages.

European Patent Office, Extended European Search Report, European Patent Application No. 12165105.3, Sep. 4, 2012, 6 Pages.

European Patent Office, Examination Report, European Patent Application No. 12165105.3, Nov. 10, 2014, seven pages.

European Patent Office, Examination Report, European Patent Application No. 12165105.3, May 28, 2014, six pages.

Summons to Attend Oral Proceedings Pursuant to Rule 115(1) EPC for European Patent Application No. EP12165105.3, Jul. 24, 2015, 7 pages.

\* cited by examiner

SYSTEM AND METHOD OF FIXING MISTAKES BY GOING BACK IN AN ELECTRONIC DEVICE

FIELD OF THE INVENTION

The present invention relates to the field of vehicle communication systems and methods and, more specifically, to providing a user interface for providing information to vehicle communication systems.

BACKGROUND

In-vehicle systems capable of providing navigation instructions, playing a song, making a phone call, etc, have become commonplace in vehicles. In-vehicle systems can comprise interface buttons, joysticks, touch interface display monitors, microphones and speakers to allow users to interact with the in-vehicle system. Users typically use a microphone to input speech or voice commands, wherein the in-vehicle system interprets the user's speech command and executes one or more actions responsive to the user's command. However, in-vehicle systems can often make mistakes in recognizing users' speech commands.

In-vehicle systems typically allow a user to re-input a speech command when the in-vehicle system does not recognize an input or when a user indicates that the in-vehicle system misrecognized the user's command. However, such a method of fixing mistakes in recognizing a user's input is ineffective. For example, a user can re-input the same speech command in order to fix a previously misrecognized command and the in-vehicle system can make the same mistake in misrecognizing the users' input. A user can thus be required to re-input a speech command several times without fixing the mistake in the in-vehicle system's recognition of the speech command. Such a method of re-inputting speech commands without yielding correct results can frustrate a user and lead to a poor user experience.

In addition, the American Axle and Manufacturing Guidelines (AAM GL), provides that a single glance time on display screen of an in-vehicle system should not exceed two seconds and the time to complete a task on an in-vehicle system should not exceed twenty seconds of total glance time. A user seeking to fix mistakes in an in-vehicle system's recognition a voice command by re-inputting the speech command typically has to perform a series of steps. For example, a user seeking to re-input a misrecognized address must press a 'back' or a 'home' button one or more times to reach a state name input interface, a city name, street number or street name input interface menus and re-input location information in each interface menu. Such a method of fixing mistakes thus typically requires more than two seconds of glance time and more than twenty seconds to complete the input task.

SUMMARY

Embodiments of the present invention provide a method (and corresponding system and computer program product) for fixing user input errors in a destination address provided to an in-vehicle computing system. The method receives a destination address in a first user input and interprets the received destination address. The interpreted destination address is presented to the user. If a second user input indicating an error in the presented address is received by the in-vehicle computing system, the user is requested to re-enter a first portion of the destination address, wherein the destination address includes a first portion and a second portion of the address. The first portion of the destination address is selected if it most likely to be incorrect. The in-vehicle computing system receives a third user input providing the first portion of the destination address. The destination address is identified based on the third user input of the first portion of the destination address and the first input of the second portion of the destination address.

Other embodiments of the present invention provide a method (and corresponding system and computer program product) for fixing user input errors in an in-vehicle computing system wherein a first user input is received and interpreted by the in-vehicle computing system. The interpreted user input is presented to the user and a second user input indicating an error in the presented user input is received. Responsive to the second user input, the user is provided with a new query requesting the user to input a portion of the first input. The requested portion of the first input can include a category associated with the user input that is most likely to be incorrect. Responsive to receiving a third user input providing the requested portion of the first input, the in-vehicle system identifies the user input based on the first user input and the third user input.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

Figure 1:
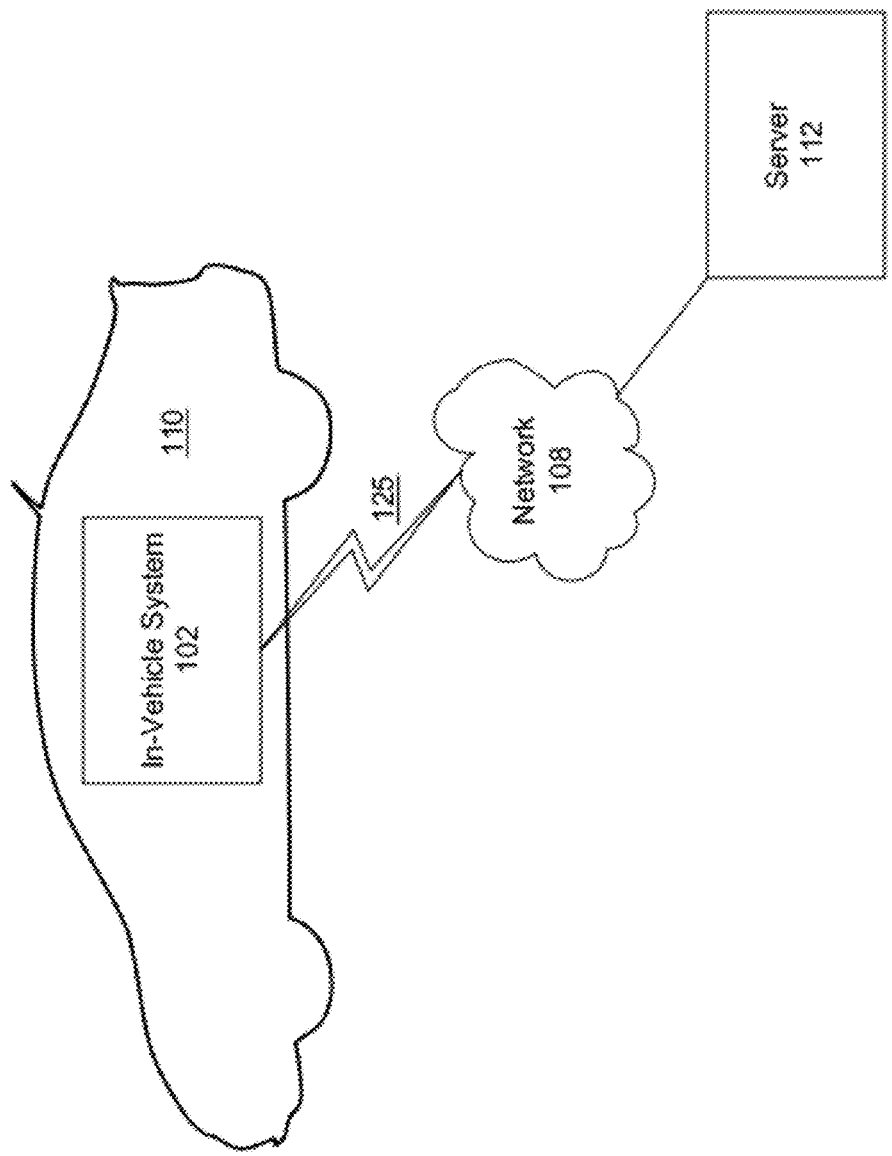
FIG. 1 is an illustration of an environment in which one embodiment may operate.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments are intended to be illustrative, but not limiting, of the scope of the embodiments, which are set forth in the claims.

SYSTEM ARCHITECTURE

FIG. 1 illustrates an exemplary operating environment 100 for various embodiments. The operating environment 100 includes a vehicle 110 having an in-vehicle system 102, a network 108, a wireless networking communication link 125 between the in-vehicle system 102 and the network 130, and a server connected to the network 108. The communication link 125 described herein can directly or indirectly connect these devices.

The in-vehicle system 102 comprises a computing device that may be part of the vehicle's telematics system. An embodiment of the in-vehicle system 102 is described in further detail below with reference to FIG. 3. In general, the in-vehicle system 102 is configured to display information to the user via a display screen and accept inputs from the user to control various functions. The in-vehicle system 102 includes a wireless networking communication link to allow the in-vehicle system 112 to connect to a network 108 to communicate with one or more servers 112. This allows, for example, the in-vehicle system 112 to obtain point of interest information or prior usage history data from the server, display the point of interest information on the in-vehicle system 112, and provide controls that enable the user to manage various features of the in-vehicle system.

The network 108 may include a wireless communication network, for example, a cellular telephony network, as well as one or more other networks, such as the Internet, a public-switched telephone network (PSTN), a packet-switching network, a frame-relay network, a fiber-optic network, a Wifi network, a WiMAX network, a CDMA network, a GSM network, a 3G network, a 4G network, or other wireless networks.

The server 112 comprises computing devices that communicate over the network 108 to carry out various functions and/or to store data accessible to the in-vehicle system 102 or other devices on the network 108. In one embodiment, the server 112 stores, for a particular user, a set of contacts entries and provides contacts data pertaining to these entries to requesting devices on the network 108. Each contact entry provides various metadata associated with persons or business such as, for example, name, address, phone number, email address, website, etc. The server 112 can also store and process voice notes, i.e., a spoken memo recorded by a user. For example, the server 112 may perform speech-to-text conversion on voice notes received from a mobile device connected to the in-vehicle system and return dictated text to the in-vehicle system 102. In an embodiment, the server 112 may also store the recorded audio files and/or deliver the audio files to the user via an email or text messaging service.

Although only one server 112 is illustrated for clarity, in practice, multiple servers may be present on the network 10. Furthermore, two or more of the servers 112 may be combined in a single computing device.

In operation, the in-vehicle system 102 and the server 112 communicate with each other via a wireless communications network 108. The server 112 stores information received from the in-vehicle system 102, such as prior inputs including navigation addresses, points of interests, music or song selections etc. Similarly, the in-vehicle system 102 may store information from the remote server 112. In one embodiment, the in-vehicle system connects to a mobile computing device such as cell phone over short-range communication technology, such as, for example, Bluetooth® technology or other short-range communication technology, for example, Universal Serial Bus (USB). The in-vehicle system 102 can use the connected mobile computing device to indirectly communicate via the network 108, even if the in-vehicle system 112 is not equipped to access the network 108 directly.

Figure 2:
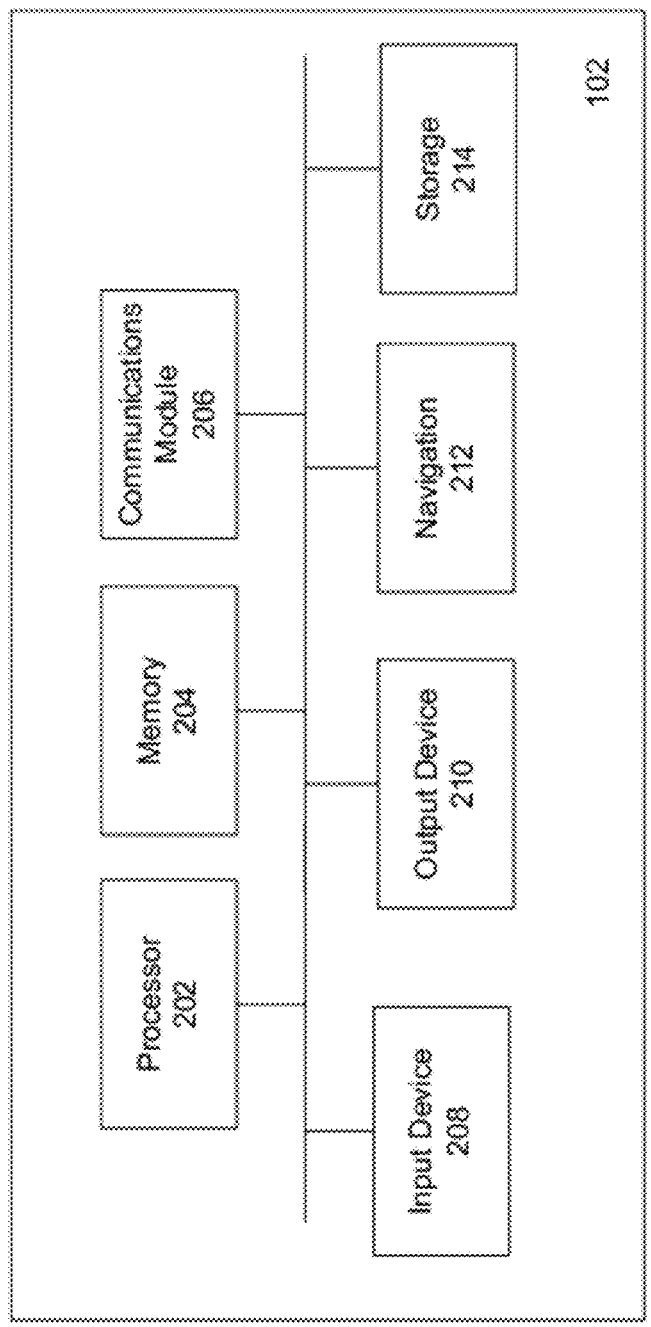
FIG. 2 is a block diagram of an in-vehicle system in accordance with one embodiment.

FIG. 2 is a block diagram illustrating an embodiment of the in-vehicle system 102. In one embodiment, the in-vehicle system 102 may include processor 202, memory 204, communications module 206, input device 208, output device 210, navigation device 212 and storage 214. Other conventional components of the in-vehicle system 102 such as a clock, input keys, etc are omitted for clarity of description.

Processor 202 may include one or more conventional processors that interpret and execute instructions stored in a tangible medium, such as memory 204, a media card, flash RAM, or other tangible medium. Memory 204 may include random access memory (RAM), or another type of dynamic storage device, and/or read-only memory (ROM), or another type of static storage device, for storing information and instructions for execution by processor 202. RAM, or another type of dynamic storage device, may store instructions as well as temporary variables or other intermediate information used during execution of instructions by processor 202. ROM, or another type of static storage device, may store static information and instructions for processor 202, as described above.

The communications module 206 can include a transceiver for transmitting and receiving information via a wireless communications network, including a cellular telephony network or short-range communication technology such as, for example, Bluetooth® or other short-range communication technology, for example, Universal Serial Bus (USB).

Input device 208 may include hard keys and/or soft keys, a microphone, a touchscreen, and/or other input device. Output device 210 may include a speaker and/or a display.

The navigation unit 212 may include a communications system for determining the vehicle's position and direction of travel on a map, and computing resources to guide a vehicle 110 to a destination. For example, the navigation unit 212 may include a satellite communication module for communicating with global positioning satellites.

The storage unit 214 includes any type of storage device for storing information. In one embodiment, the storage unit 214 stores a database of points of interests. The storage unit 214 can also store destination addresses previously inputted by a user. In other embodiments, the storage unit 214 is used to store points of interests or destination addresses retrieved from a server 112 over a network 108.

Figure 3:
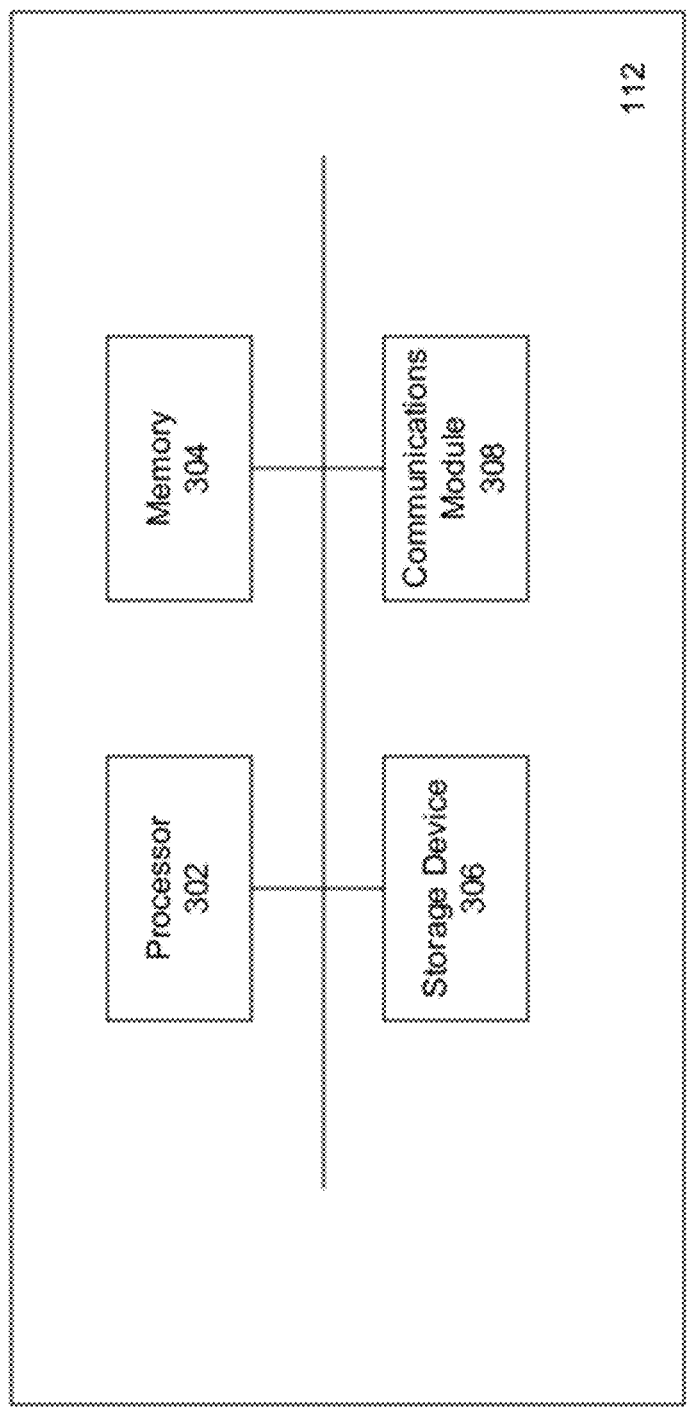
FIG. 3 is a block diagram of a server in accordance with one embodiment.

FIG. 3 is a functional block diagram of an exemplary embodiment of server 112. Server 112 may include a processor 302, a memory 304, a storage device 306, and a networking communication module 308.

Processor 302 may include one or more conventional processors that interpret and execute instructions stored in a tangible medium, such as memory 304, a media card, flash RAM, or other tangible medium. As described above with reference to memory 204, memory 304 may include random access memory (RAM) or another type of dynamic storage device, and read-only memory (ROM) or another type of static storage device. RAM, or another type of dynamic storage device, may store instructions as well as temporary variables or other intermediate information used during execution of instructions by processor 302. ROM, or another type of static storage device, may store static information and instructions for processor 302.

Networking communication module 308 may include a transceiver for transmitting and receiving information via a wired or wireless communication network, such as network 108 or other network.

The embodiments described herein allow the in-vehicle system 102 to execute a command provided by a user input. Additionally, the embodiments presented herein permit a user to enter a destination address using Full String Address Entry (FSA), wherein a user can input an address by speaking the entire address into a microphone or another input device associated with the in-vehicle system. Thus, a user can input a destination address in one user interface menu without any additional contextual inputs or additional interface navigation. However, the in-vehicle system 102 can misrecognize a user's input. The embodiments provided herein allow the in-vehicle system to use logic to determine the portion of the user's input that is likely misrecognized. The in-vehicle system 102 can request the user to re-input only a portion of the input likely to have been misrecognized. Thus, the system and method disclosed herein provides a positive user experience wherein the in-vehicle system does not continually misrecognize the same portion of the user input.

OPERATION AND USE

Fixing Mistakes in Identifying a Destination Address

Figure 4:
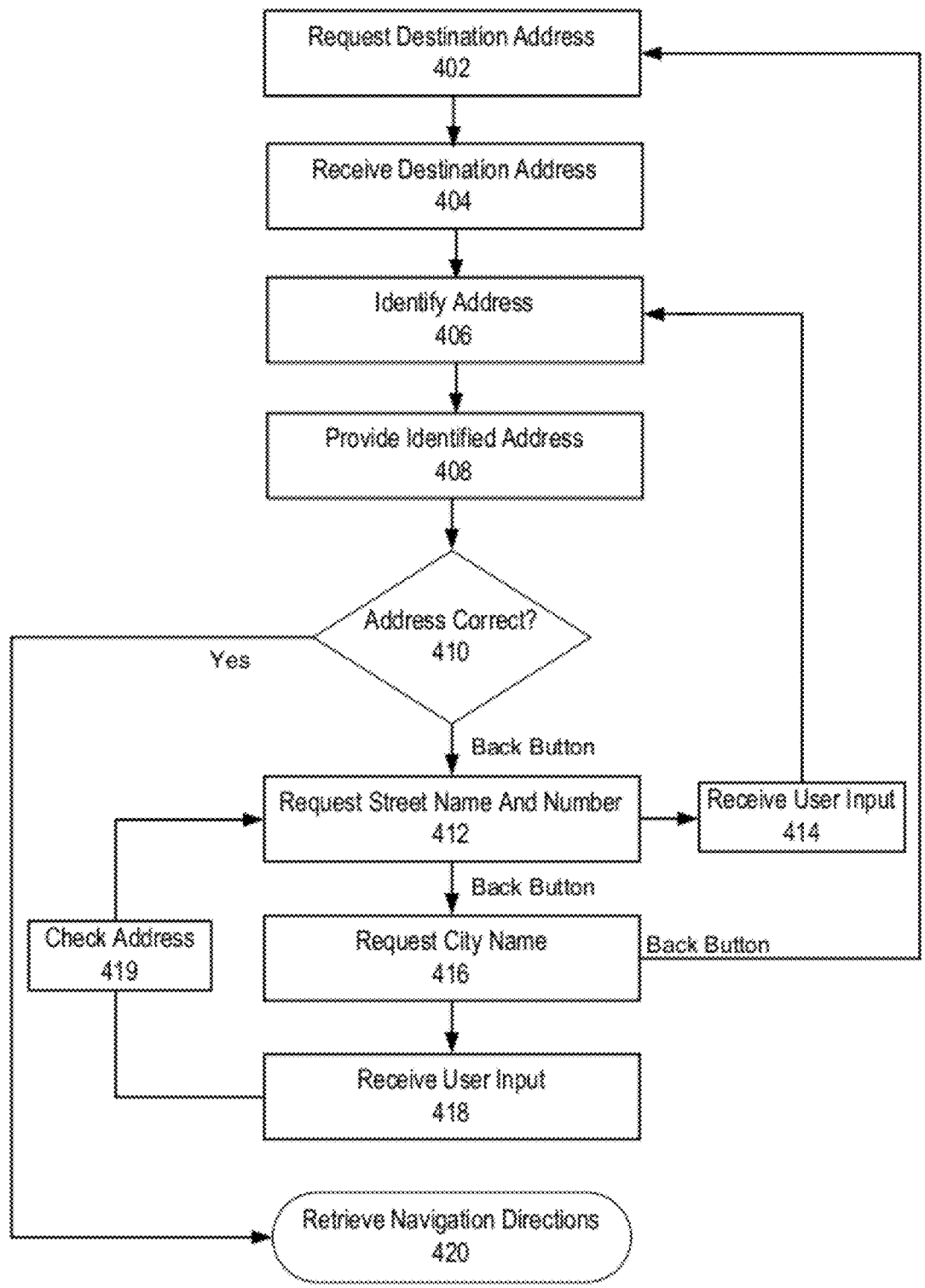
FIG. 4 is a flowchart of a method of fixing mistakes in user input recognition to retrieve navigation directions in accordance with one embodiment of the in-vehicle system.

FIG. 4 is a flowchart of a method of fixing mistakes in recognizing user inputs to retrieve navigation directions in accordance with one embodiment of the in-vehicle system. Various steps of the process are illustrated as being performed by the in-vehicle system 102. In alternative embodiments, steps may be performed by different entities, or more than one entity may collectively carry out the described steps.

Figure 5:
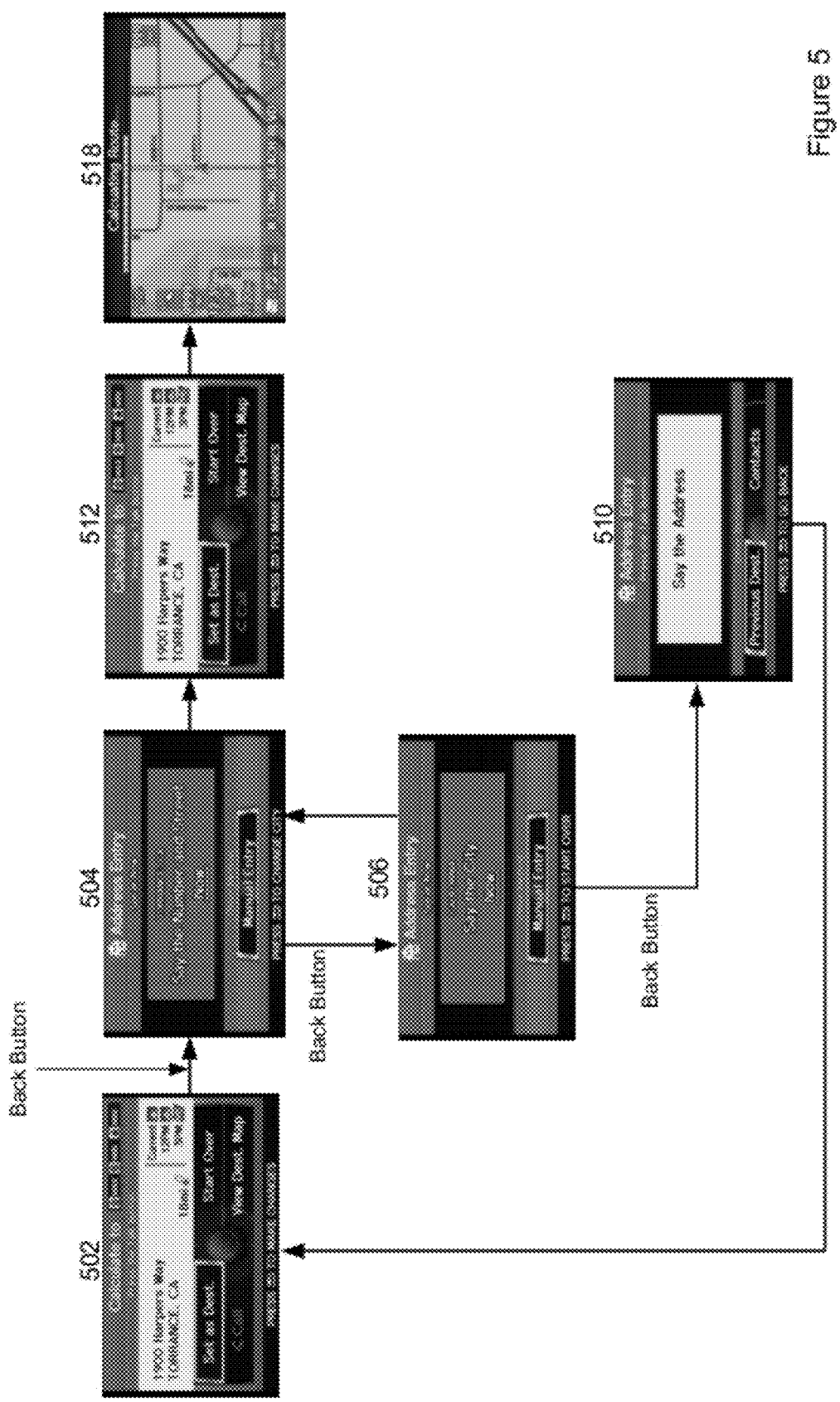
FIG. 5 illustrates a flow of user interfaces for fixing mistakes in user input recognition to retrieve navigation directions in accordance with one embodiment of the in-vehicle system.

FIG. 5 illustrates a flow of user interfaces for fixing mistakes in recognizing user inputs to retrieve navigation directions in accordance with one embodiment of the in-vehicle system. For the purposes of discussion below, FIGS. 4 and 5 are discussed concurrently.

In order to provide navigation directions to a user of a vehicle 110, the in-vehicle 102 system requests 402 a destination address. The in-vehicle system 102 can display one or more user interface menus wherein the user can input a destination address. For example, the in-vehicle system can provide four user interface menus in succession requesting a destination state, city, street number and street name, respectively. In one embodiment, the in-vehicle system can provide one user interface menu requesting a user to enter a destination address as a full string address entry, wherein the user provides the street number, street name, city, state and zip code in a singular input entry.

The user can input a destination address using any input device 208 provided by the in-vehicle system 102 and the vehicle 110. In one embodiment, the user can input a destination by speaking the address information into a microphone associated with the in-vehicle system. Similarly, the user can use connected keyboard or a keyboard interface displayed on a touch screen or using other text entry systems to input a destination address. In another embodiment, the user can use a mobile computing device connected to the in-vehicle system 102 via a short range communications link such as Bluetooth® technology to send a destination address to the in-vehicle system 102.

The in-vehicle system 102 receives 404 the destination address provided by a user and identifies 406 the address. In one embodiment, the in-vehicle system stores a database of destination states, cities, and streets. Thus the in-vehicle system can identify 406 a destination address by matching the received 404 destination address with one or more addresses stored in the in-vehicle system's database. For example, the in-vehicle system can identify 406 a destination state of the received 404 destination address with a database of destination address states. Similarly, the in-vehicle system can identify the destination city provided by the user by matching the user's input with a database of destination cities associated with the identified state and so forth for the street name and street number. In another embodiment, the server 112 connected to the in-vehicle system 102 over a network 108 stores a database of destination states, cities and streets. In such an embodiment, the in-vehicle system provides the received 404 address to the server 112, wherein the server identifies 406 a destination address by matching the received address with one or more addresses in a database stored on the server 112. The server 112 can provide the identified address to the in-vehicle system 102 over a network 108.

The in-vehicle system provides 408 the identified address to the user. The in-vehicle system can use any output device 210, such as an image display monitor, a touch screen display monitor, speakers, etc to provide 408 the identified address to a user. An exemplary user interface 502 displaying the identified address is provided in FIG. 5, according to one embodiment. The user interface 502 can display the identified address and one or more executable commands, wherein the user can use an input device such as a touch screen display to select and execute the commands. For example, the user interface 502 can provide one or more interface components to allow a user the set the displayed address as the destination address, to allow a user to make changes to the displayed address, or view a destination map, etc.

In one embodiment, if the address provided 408 to the user is correct 410, the user can execute a command to retrieve navigation directions to the address. In such an instance, the in-vehicle system retrieves 420 navigation directions to the provided 408 address. The in-vehicle system can compute a navigation route to the destination address based on navigation data stored in the memory 204 of the in-vehicle system. In another embodiment, the in-vehicle system can retrieve 420 navigation directions from a server 112 via a network 108.

In another embodiment, if the address provided 408 to the user is incorrect 410, the user can execute a command to correct the provided address. Any executable command provided by the in-vehicle system can be used to fix an error in recognizing a destination address provided by the user. For example, the in-vehicle system can provide that a user can press a 'back' button or say 'back' or 'fix address' to make changes to the displayed address. For the purpose of illustration and simplicity the user interface command wherein a user can fix an error in recognizing a destination address provided by the user is illustrated as the 'Back Button' in the specification and in FIGS. 4 and 5.

The in-vehicle system 102 can receive an input from a user indicating that the user would like to update or correct the destination address provided to the user. As described herein, the user input can include pressing a 'back button' on an input device 208 associated with the in-vehicle system. Responsive to the user input, the in-vehicle system requests 412 the user to enter a street name and number of destination address. Thus, the user is not required to re-input the entire destination address. As such, the in-vehicle system can more accurately determine the requested destination address while requiring the user to provide only a portion of the address.

In one embodiment, responsive to user input, the in-vehicle system requests 412 the street name and number of the destination address from the user. As described in the specification, the in-vehicle system can request 412 the user to input a street name and address using any input device associated with the in-vehicle system. For example, the in-vehicle system can request a user input by using one or more speakers, a display monitor, a touch screen display, etc. In one embodiment, the in-vehicle system can request a user to re-enter a street name and number by displaying a user interface 504 including the destination city and state, such as 'Torrance, Calif.' and requesting the user to 'say the number and street.' The user interface 504 requesting a user to re-enter the street name and number can also include other user executable commands allowing the user to change the method of entry, or an interface component allowing the user to the change the city of the destination address.

In one embodiment, the in-vehicle system can request a user to input another portion of the destination address. In such an embodiment, the in-vehicle system can request a user to re-input a portion of the address most likely to have been misrecognized by the in-vehicle system. For example, the in-vehicle system can request a user to re-input the city of the destination address if the in-vehicle system most likely misrecognized the city of the destination address. The in-vehicle system can use several methods known in the art to determine a portion of the input address mostly likely to have been misrecognized. For example, the in-vehicle system can determine the number of database entries associated with each portion of the destination address, wherein the portion of the address with the most database entries is identified as most likely misrecognized. Since a database of addresses generally contains more street names than city names and state names, the in-vehicle system recognizes the street name and number as most likely to have been misrecognized by the in-vehicle system and requests a user to re-enter the street name and number. In another instance, a user can set a preference in a user profile to re-enter a city name first whenever a destination address is misrecognized by the in-vehicle system. In such an instance, the in-vehicle system can request a user to re-input a city name first. In another embodiment, if the address is incorrect, each portion of the address can be displayed to the user and the user can identify the incorrect portion which can be re-entered. In yet another embodiment, the in-vehicle system can use a scoring algorithm to determine a portion of the address most likely to be misrecognized. For example, when a user provides an input command, the in-vehicle system receives the input command and assigns a confidence score to the input command. In one embodiment, the confidence score is a measure of the likelihood that the in-vehicle system misrecognized the user input command.

Confidence scores above or below a predetermined threshold value may be identified as likely to have been misrecognized by the in-vehicle system. Thus, for example, if the street name portion of the input address receives a confidence score which is beyond the threshold value, the street of the address is identified as mostly likely to have been misrecognized.

A user can re-enter the destination address' street name and number using an input device 208 associated with the in-vehicle system. As described in the specification the user can re-input the street name and number using input devices 208 such as a microphone, a keyboard, touch sensitive display screen, etc. The in-vehicle system receives 414 the user input and identifies 406 the address based on the re-inputted street name and number and the previously provided state and city of the destination address. As described herein, the in-vehicle system identifies the address by matching the user inputs with destination addresses stored in a database on the in-vehicle system 102 or on a server 112 connected via a network 108. As described in the specification, the in-vehicle system provides 408 the identified address to the user using one or more output devices 210 associated with the in-vehicle system. If the identified address is correct 410, the in-vehicle system retrieves navigation system retrieves 420 navigation directions to the address.

A user can choose to press a back button or any other input provided by the in-vehicle system to re-input or correct the city name of the destination address provided 408 by the in-vehicle system. Responsive to the user providing such an input, the in-vehicle system requests 416 the user to re-enter a city name of the destination address. In one embodiment, the in-vehicle system can request a user to re-enter a city name by displaying a user interface 506 including the destination state, such as 'California' and requesting the user to 'say the city.' The user interface 506 requesting a user to re-enter the state name can also include other user executable commands allowing the user to change the method of entry or an interface component allowing the user to change the city of the destination address.

The user can use any input device 208 associated with the in-vehicle system to re-enter a city name. The in-vehicle system receives 418 a user input. Responsive to receiving 418 an updated city name, the in-vehicle system checks the address 419. In one embodiment, the in-vehicle system checks the address 419 by identifying whether the city name provided by the user exists in the state provided by the user. Additionally, the system requests 412 the user to re-input a street name and number. As described in the specification, the system can request 412 a user to re-enter the street name and number using any number of input devices available to the user, including but not limited, a speech recognition system, a touch input device, a keyboard, etc. In one embodiment, the system receives 414 user input and identifies 406 a destination address based on the re-inputted city name and the re-inputted street name and number. As described in the specification, the process continues by providing 408 the identified address to the user. The address can be provided 408 to the user via a number of output devices, including but not limited to a touch interface display, an in-vehicle speaker, a mobile device connected to the in-vehicle system, etc.

In one embodiment, instead of providing an updated city name, the user may choose to re-enter the state name if the in-vehicle system incorrectly identified the state name of the destination address. The user may press a 'back' button or another input provided by the in in-vehicle system to re-enter or correct the state name. Responsive to receiving such an input, the in-vehicle system requests 402 the user re-enter the destination address. As described in the specification, the in-vehicle system requests users to enter the destination address a full string address entry, allowing a user to enter a full destination address without navigating through any additional menus or user interface components.

Fixing Mistakes in Identifying a User Input

Figure 6:
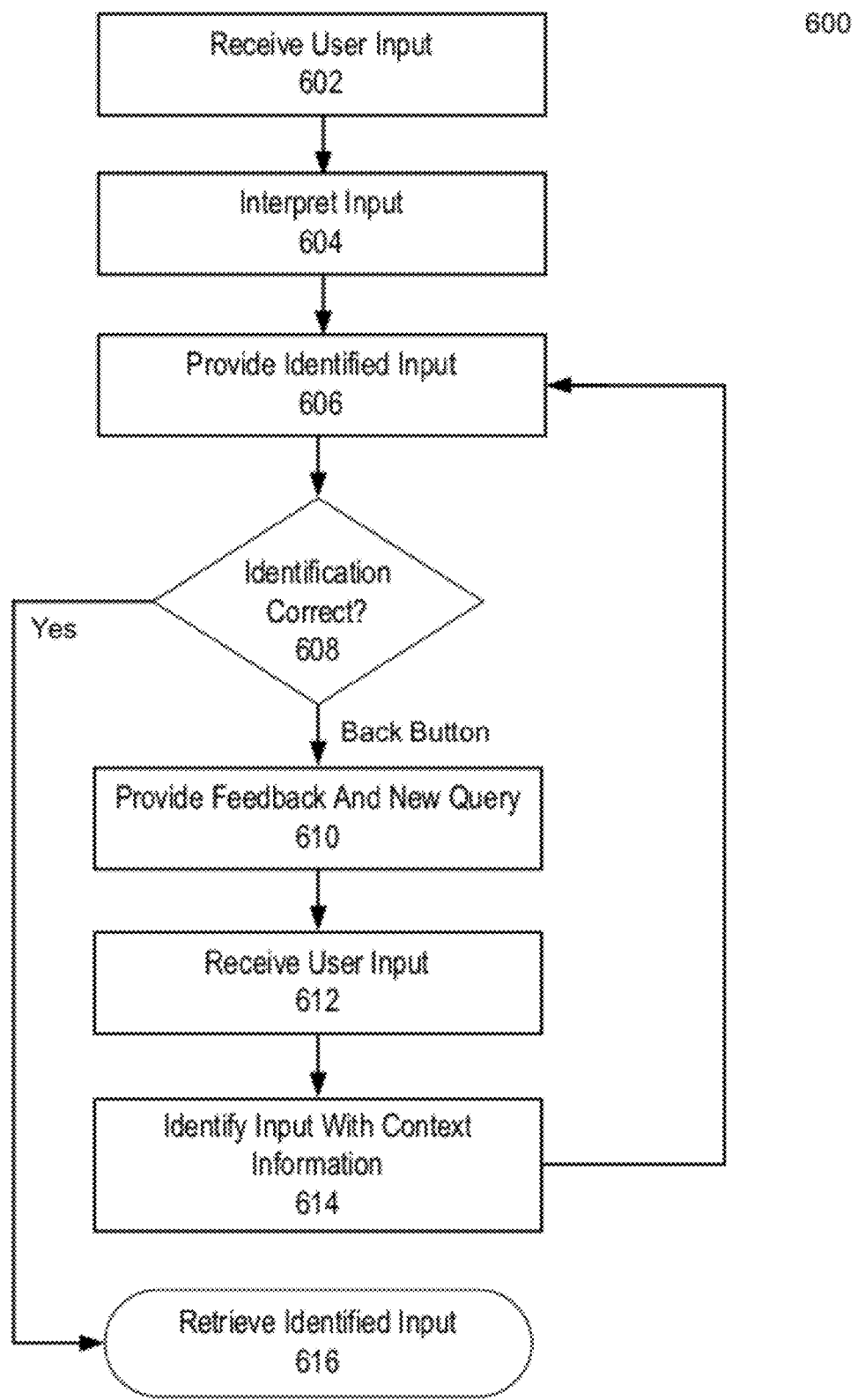
FIG. 6 is a flowchart of a method for fixing mistakes in retrieving an item based on user input and contextual information in accordance with one embodiment of the in-vehicle system.

FIG. 6 is a flowchart of a method for fixing mistakes in recognizing a user input in accordance with one embodiment of the in-vehicle system. A user can input any number of commands into the in-vehicle system 102 to retrieve information or execute commands. Examples of input commands a user can provide to an in-vehicle system include but are not limited to retrieving navigation directions, retrieving points of interests such as restaurants, movie theaters, parks, etc, playing music by particular artists or from particular albums or identifying a contact to establish a communication such as an email, standard messaging service (SMS) message or a phone call.

A user can provide an input command such as 'find MCDONALDS' to request the in-vehicle system to find a MCDONALDS restaurant closest to the user. In other instances, a user may have to provide contextual information associated with a point of interest to assist the in-vehicle system in finding the requested point of interest. An input command in a particular user interface provided by the in-vehicle system. For example, in a 'points of interest' user interface a user may have to input 'restaurants,' and in a 'restaurants' interface, a user may have to input 'MCDONALDS' to request the in-vehicle system to find a MCDONALDS restaurant.

In order to identify the point of interest the user is interested in, the in-vehicle system can ask for contextual information. For example, if a user may provide additional contextual information to identify a point of interest the user is likely interested in. For example, in identifying a restaurant, the user may provide that the restaurant must be within three miles of the vehicle's current location, and the restaurant classification must be Italian. Thus, the in-vehicle system can identify and display restaurants which match the user provided context information.

In one embodiment of the invention, the process 600 identifies mistakes in recognizing a user's input by retrieving the user's profile information or by requesting additional contextual information. An in-vehicle system 102 can receive 602 a user input to retrieve a point of interest. As described in the specification, the user input can be received by the in-vehicle system's input device 208, such as a microphone, a keyboard, a touch sensitive display, etc. The in-vehicle system can also receive contextual data to retrieve a particular point of interest. For example, the in-vehicle system 102 can receive 602 a user input comprising 'Restaurant' as a point of interest and 'Fast Food' as a type of restaurant.

The in-vehicle system 102 interprets 604 the user input including a point of interest and any contextual data. As described in the specification, any system for recognizing a user's input can be used to interpret 604 the user's input. For example, a voice recognition system can be used to recognize a user's speech input. In one embodiment, the in-vehicle system 102 displays 606 an identified user input. For example, if the in-vehicle system recognizes a user input as an 'Italian restaurant, olive garden,' the process can display 606, 'Olive Garden, Italian Restaurant.'

In one embodiment, the in-vehicle system retrieves 606 the identified input if the user indicates that the identification is correct 608. Continuing with the example above, if the user indicates that the displayed input information 'Olive Garden, Italian Restaurant' is correct, the process 600 retrieves the identified input 616 by retrieving information about the point of interest from a database, by retrieving navigation directions to the point of interest. In another example, if the user requests a playback of a song, the in-vehicle system can retrieve 616 the identified song from a local database or from a server remotely connected to the in-vehicle system.

In another embodiment, the in-vehicle system can provide 610 feedback and a new query to the user if the user indicates that the displayed identification is incorrect 608. In one embodiment, the user can provide that the identification is incorrect by pressing a back button. In other embodiments, other input buttons or methods can be used. In one embodiment, responsive to a user providing that the displayed identification is incorrect, the in-vehicle system identifies contextual information associated with the user's input 602 and identifies a database wherein the most database entries exist. For example, the more database entries that exist for a particular user input, the more likely the in-vehicle system is to make an error in correctly interpreting and matching the user input. Thus, in the above example, the in-vehicle system can provide feedback and request a user to re-enter the type of restaurant. In other instances, the in-vehicle system 102 can request other types of information, such as the maximum distance for a restaurant or a point of interest, the artist name for a song playback, an album name, park type such as amusement park or any other category associated with a point of interest. The in-vehicle system can receive 612 a user input responsive to the new query 610. As described in the specification, the in-vehicle system can interpret the user's input associated with a particular context or database. For example, if the in-vehicle system received a user input for a type of fast food restaurant, the in-vehicle system can match the user's input for a 'fast food restaurant' with entries in a database of type of restaurants.

In one embodiment, the in-vehicle system identifies 614 the user input based on the re-inputted contextual information. In the example above, the in-vehicle system can identify restaurants listed as 'fast food restaurants.' The in-vehicle system can perform another search within a subset of restaurants matching 'fast food restaurants' and matching the restaurant name originally received 602 from the user. Thus, an in-vehicle system can match fix mistakes in interpreting a user input. Unlike traditional systems, wherein a user must re-enter an entire user input, the invention uses logic to determine a portion of the user input that is most likely misinterpreted and requests a user to re-input only a portion of the input.

The in-vehicle system can display 606 the user input with updated context information 614 to the user. As discussed in the specification, the in-vehicle system can provide 606 the identified input using an output device 210 such as display monitor, speakers, etc. The process 600 can continue as described in the specification until a correct identification is received for a user input.

What is claimed is:

1. A computer based method of fixing user input errors in a full string destination address provided to an in-vehicle computing system, the method comprising:
    interpreting the full string destination address received in a first user input;
    receiving contextual information corresponding to the full string destination address in an additional user input, the contextual information comprising a commercial category associated with a particular point of interest of a plurality of points of interest, the commercial category further specifying a type of the particular point of interest;
    presenting the full string destination address;
    receiving a second user input indicating an error in the presented full string destination address;
    identifying, by the in-vehicle computing system, a first portion of the full string destination address that is most likely incorrect using the contextual information, wherein the full string destination address includes the first portion and a second portion;
    requesting a user to re-enter the first portion of the full string destination address;
    receiving a spoken third user input of the first portion of the full string destination address; and
    identifying a full string destination address based on the spoken third user input of the first portion of the full string destination address, the contextual information, and the first user input of the second portion of the full string destination address.

2. The method of claim 1, further comprising:
    requesting a user to enter the second portion of the full string destination address responsive to receiving a fourth user input indicating an error in the presented full string destination address;
    receiving a fifth user input of the second portion of the full string destination address; and
    identifying a full string destination address based on the first user input of the first portion of the full string destination address and the fifth user input of the second portion of the full string destination address.

3. The method of claim 1, further comprising:
    requesting a user to re-enter the second portion of the full string destination address responsive to receiving a fourth user input indicating an error in the presented full string destination address;
    receiving a fifth user input of the second portion of the full string destination address;
    requesting the user to re-enter the first portion of the full string destination address responsive to the user providing the fifth user input;
    receiving a sixth user input of the first portion of the full string destination address; and
    identifying a destination address based on the fifth user input of the second portion of the full string destination address and the sixth user input of the first portion of the full string destination address.

4. The method of claim 1, wherein the first portion of the full string destination address comprises a street number and name of the destination address.

5. The method of claim 1, wherein the second portion of the full string destination address comprises city name of the full string destination address.

6. The method of claim 1, wherein the user input is received as a speech command, a keypad input and a touch screen input.

7. The method of claim 1, wherein the user input indicating an error in the interpreted destination address is provided by the activation of a back button and a back speech command.

8. A system for fixing user input errors in a full string destination address provided to an in-vehicle computing system, the system comprising:
    a computer processor for executing executable computer program code;
    a computer-readable storage medium containing the executable computer program code for performing a method comprising:
        interpreting the full string destination address received in a first user input;

receiving contextual information corresponding to the full string destination address in an additional user input, the contextual information comprising a commercial category associated with a particular point of interest of a plurality of points of interest, the commercial category further specifying a type of the particular point of interest;

presenting the full string destination address;

receiving a second user input indicating an error in the presented full string destination address;

identifying, by the in-vehicle computing system, a first portion of the full string destination address that is most likely incorrect using the contextual information, wherein the full string destination address includes the first portion and a second portion;

requesting a user to re-enter the first portion of the full string destination address;

receiving a spoken third user input providing the first portion of the full string destination address; and identifying a full string destination address based on the spoken third user input of the first portion of the full string destination address, the contextual information, and the first user input of the second portion of the full string destination address.

9. The system of claim 8, further comprising:
a computer-readable storage medium containing the executable computer program code for performing a method comprising:
  requesting a user to enter the second portion of the full string destination address responsive to receiving a fourth user input indicating an error in the presented full string destination address;
  receiving a full string fifth user input providing the second portion of the full string destination address; and
  identifying a full string destination address based on the first user input of the first portion of the full string destination address and the fifth user input of the second portion of the full string destination address.

10. The system of claim 8, further comprising:
a computer-readable storage medium containing the executable computer program code for performing a method comprising:
  requesting a user to re-enter the second portion of the full string destination address responsive to receiving a fourth user input indicating an error in the presented full string destination address;
  receiving a fifth user input providing the second portion of the full string destination address;
  requesting the user to re-enter the first portion of the full string destination address responsive to the user providing the fifth user input;
  receiving a sixth user input providing the first portion of the full string destination address; and
  identifying a full string destination address based on the fifth user input of the second portion of the full string destination address and the sixth user input of the first portion of the full string destination address.

11. A computer program product for fixing user input errors in a full string destination address provided to an in-vehicle computing system, the computer program product comprising a non-transitory computer-readable storage medium containing computer program code for:
  interpreting the full string destination address received in a first user input;
  receiving contextual information corresponding to the full string destination address in an additional user input, the contextual information comprising a commercial category associated with a particular point of interest of a plurality of points of interest, the commercial category further specifying a type of the particular point of interest;
  presenting the full string destination address;
  receiving a second user input indicating an error in the presented full string destination address;
  identifying, by the in-vehicle computing system, a first portion of the full string destination address that is most likely incorrect using the contextual information, wherein the full string destination address includes the first portion and a second portion;
  requesting a user to re-enter the first portion of the full string destination address;
  receiving a spoken third user input providing the first portion of the full string destination address; and
  identifying a full string destination address based on the spoken third user input of the first portion of the full string destination address, the contextual information, and the first user input of the second portion of the full string destination address.

12. A computer based method of fixing user input errors in an in-vehicle computing system, the method comprising:
  interpreting an entire first user input received by the in-vehicle computing system, the entire first user input including a full string destination address and contextual information corresponding to the full string destination address, the contextual information comprising a commercial category associated with a particular point of interest of a plurality of points of interest, the commercial category further specifying a type of the particular point of interest;
  presenting the interpreted input to the user;
  receiving a second user input indicating an error in the entire first user input;
  identifying, by the in-vehicle computing system, a first portion of the received entire first user input most likely to be incorrect using the contextual information, wherein the input portions include the first portion and a second portion;
  providing a new query requesting the user to re-enter the first portion received by the in-vehicle computing system;
  receiving a spoken third user input of the first portion responsive to the new query; and
  identifying the full string destination address corresponding to the entire first user input based on the entire first user input, the spoken third user input, and the contextual information.

13. The method of claim 12, further comprising:
  providing the identified first portion of the user input to the user; and
  retrieving the entire first user input if no additional user inputs indicating an error in the entire first user input are received by the in-vehicle computing system.

14. The method of claim 12, further comprising:
  receiving a fourth user input indicating an error in the identified first portion of the entire first user input; and
  providing a new query requesting a user to input another portion of the entire first user input received by the in-vehicle system.

15. The method of claim 12, wherein the entire first user input is received as a speech command and the user inputs are interpreted using a voice recognition system.

16. The method of claim 12, wherein the commercial category is selected if it has the most number of entries.

17. The method of claim 12, wherein the commercial category is selected based on preferences provided in a user profile.

18. The method of claim 12, wherein the commercial category includes, restaurant type, park type, album name and artist name.

19. A system for providing a human user with a guided movement and feedback, the system comprising:
- a computer processor for executing executable computer program code;
- a computer-readable storage medium containing the executable computer program code for performing a method comprising:
  - interpreting an entire first user input received by an in-vehicle computing system;
  - receiving contextual information corresponding to the full string destination address in an additional user input, the contextual information comprising a commercial category associated with a particular point of interest of a plurality of points of interest, the commercial category further specifying a type of the particular point of interest;
  - presenting the interpreted entire first user input to the user;
  - receiving a second user input indicating an error in the entire first user input;
  - identifying, by the in-vehicle computing system, a first portion of the received input most likely to be incorrect using the contextual information, wherein the input portions include the first portion and a second portion;
  - providing a new query requesting the user to re-enter the first portion received by the in-vehicle computing system;
  - receiving a spoken third user input of the first portion responsive to the new query; and
  - identifying the full string destination address corresponding to the entire first user input based on the entire first user input, the spoken third user input, and the contextual information.

20. A computer program product for providing a human user with a guided movement and feedback, the computer program product comprising a non-transitory computer-readable storage medium containing executable computer program code for performing a method comprising:
- interpreting an entire first user input received by an in-vehicle computing system, the entire first user input including a full string destination address;
- receiving contextual information corresponding to the full string destination address in an additional user input, the contextual information comprising a commercial category associated with a particular point of interest of a plurality of points of interest, the commercial category further specifying a type of the particular point of interest;
- presenting the interpreted input to the user;
- receiving a second user input indicating an error in the entire first user input;
- identifying, by the in-vehicle computing system, a first portion of the received input most likely to be incorrect using the contextual information, wherein the input portions includes the first portion and a second portion;
- providing a new query requesting the user to re-enter the first portion received by the in-vehicle computing system;
- receiving a spoken third user input of the first portion responsive to the new query; and
- identifying the full string destination address corresponding to the entire first user input based on the entire first user input, the spoken third user input, and the contextual information.

* * * * *